(12) United States Patent
Park (10) Patent No.: US 8,387,480 B2
(45) Date of Patent: Mar. 5, 2013

(54) SCISSORS GEAR (75) Inventor: Byungok Park, Hwaseong-si (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 666 days.

(21) Appl. No.: 12/617,528

(22) Filed: Nov. 12, 2009

(65) Prior Publication Data
US 2010/0139431 A1    Jun. 10, 2010

(30) Foreign Application Priority Data
Dec. 5, 2008   (KR) .................. 10-2008-0123135

(51) Int. Cl.
*F16H 55/18* (2006.01)
(52) U.S. Cl. ............... 74/409; 74/411; 74/439; 74/440; 74/443; 74/444
(58) Field of Classification Search .............. 74/409, 74/434, 439, 440, 443, 444, 467, 468, 406, 74/411
See application file for complete search history.

(56) References Cited

U.S. PATENT DOCUMENTS

| | | | | |
|---|---|---|---|---|
| 2,081,644 A | * | 5/1937 | Smythe | 74/440 |
| 2,640,428 A | * | 6/1953 | Houghton | 417/338 |
| 2,896,466 A | * | 7/1959 | Wiseman | 74/440 |
| 3,486,663 A | * | 12/1969 | Humphrey | 222/207 |
| 4,072,064 A | * | 2/1978 | Lloyd et al. | 74/409 |
| 4,422,344 A | * | 12/1983 | Wutherich | 74/409 |
| 4,554,842 A | * | 11/1985 | Wood, III | 74/409 |
| 4,688,441 A | * | 8/1987 | Yasukawa et al. | 74/409 |
| 4,840,149 A | * | 6/1989 | Fujita | 123/90.31 |
| 4,919,167 A | * | 4/1990 | Manska | 137/512 |
| 5,417,480 A | * | 5/1995 | Nishii et al. | 303/84.1 |
| 5,899,181 A | * | 5/1999 | Kurata et al. | 123/90.17 |
| 6,136,183 A | * | 10/2000 | Suzuki et al. | 210/130 |
| 6,857,364 B2 | * | 2/2005 | Gorbing et al. | 101/230 |
| 7,086,302 B2 | * | 8/2006 | Ask et al. | 74/409 |
| 2002/0121152 A1 | * | 9/2002 | White et al. | 74/445 |
| 2004/0200302 A1 | * | 10/2004 | Kampichler et al. | 74/409 |

* cited by examiner

*Primary Examiner* — Troy Chambers
*Assistant Examiner* — Valentin Craciun
(74) *Attorney, Agent, or Firm* — Morgan, Lewis & Bockius LLP (57) ABSTRACT

A scissors gear may include a main gear and a sub-gear co-axially combined by a scissors spring therebetween to integrally rotate, a first oil supply hole formed in the main gear or the sub-gear to supply oil from the outside, an oil groove formed in the sub-gear or the main gear to receive the oil by being selectively communicated with the first oil supply hole, and a check valve that is disposed in the main gear or the sub-gear to open/close the oil groove.

14 Claims, 9 Drawing Sheets

SCISSORS GEAR

CROSS-REFERENCE TO RELATED APPLICATION

The present application claims priority from, Korean Patent Application Number 10-2008-0123135, filed on Dec. 5, 2008, the entire contents of which are incorporated herein for all purposes by this reference.

BACKGROUND OF THE INVENTION

1. Field of the Invention

The present invention relates to a scissors gear, particularly a scissors gear that effectively reduces vibration and noise using a damping force of oil.

2. Description of Related Art

In general, a gear assembly is a device that smoothly transmits rotational power using two gears engaged with each other and has been widely used because of high durability and a property of smooth power transmission. However, backlash should be provided for smooth engagement of the teeth of the two gears and rattling is generated by collision of the teeth due to the backlash while the gears rotate.

Scissors gears have been used to reduce the rattling. The scissors gear is applied to a driving gear or a driven gear and one gear is connected with the other gear by a scissors spring. Accordingly, when the teeth of a counterpart gear are engaged with the scissors gear, the teeth of the scissor gear are engaged with the teeth of the counterpart gear like scissors, such that backlash is removed and operational noise of the gears is reduced.

However, since two separate gears are connected only by a spring in scissors gears in the related art, they have a limit in achieving stable and excellent dynamic properties and reducing operational noise of the gears correspondingly.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a scissor gear that can effectively reduce vibration and noise of the scissors gear by improving dynamic properties of the scissors gear to apply a damping force of oil to the scissors gear.

In an aspect of the present invention, a scissors gear may include a main gear and a sub-gear co-axially combined by a scissors spring therebetween to integrally rotate, a first oil supply hole formed in the main gear or the sub-gear to supply oil from the outside, an oil groove formed in the sub-gear or the main gear to receive the oil by being selectively communicated with the first oil supply hole, and a check valve that is disposed in the main gear or the sub-gear to open/close the oil groove.

The check valve may be disposed to be biased against the oil groove by an elastic member and the check valve has an upward slope portion that opens the oil groove while the check valve is pushed upward by an oil pressure supplied from the first oil supply hole and a downward slope portion that closes the oil groove while the check valve is pressed downward by an oil pressure in the oil groove The upward slope portion may be formed to face the first oil supply hole and the downward slope portion is formed at the opposite side of the upward slope portion.

The upward slope portion may be formed to be slanted with a predetermined acute angle toward the first oil supply hole.

The downward slope portion may be formed to be slanted with a predetermined obtuse angle toward the first oil supply hole.

A gear shaft may be fitted in the main gear and the sub-gear, and a second oil supply hole through which the oil is supplied from the outside and an oil channel for supplying the oil in the second oil supply hole into the first oil supply hole of the main gear are formed in the gear shaft, wherein the gear shaft is supplied with the oil from a main oil gallery of a cylinder head.

In another aspect of the present invention, the scissors gear may include a main gear and a sub-gear that are co-axially combined by a scissors spring to integrally rotate, a first oil supply hole formed in the main gear or the sub-gear to supply oil from the outside, an oil groove formed in the sub-gear or the main gear to receive the oil by being selectively communicated with the first oil supply hole, and a check valve that is disposed in the main gear or the sub-gear to open/close the oil groove and to be biased against the oil groove via an elastic member.

According to the scissors gear of the present invention, the check valve disposed in the main gear restricts of flow of the oil in the oil groove formed in the sub-gear while moving along the oil groove, such that a damping force generated in the this operation quickly absorbs and reduces vibration of the scissors gear. Therefore, it is possible to improve dynamic properties of the scissors gear and effectively reduce operational noise of the scissors gear.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
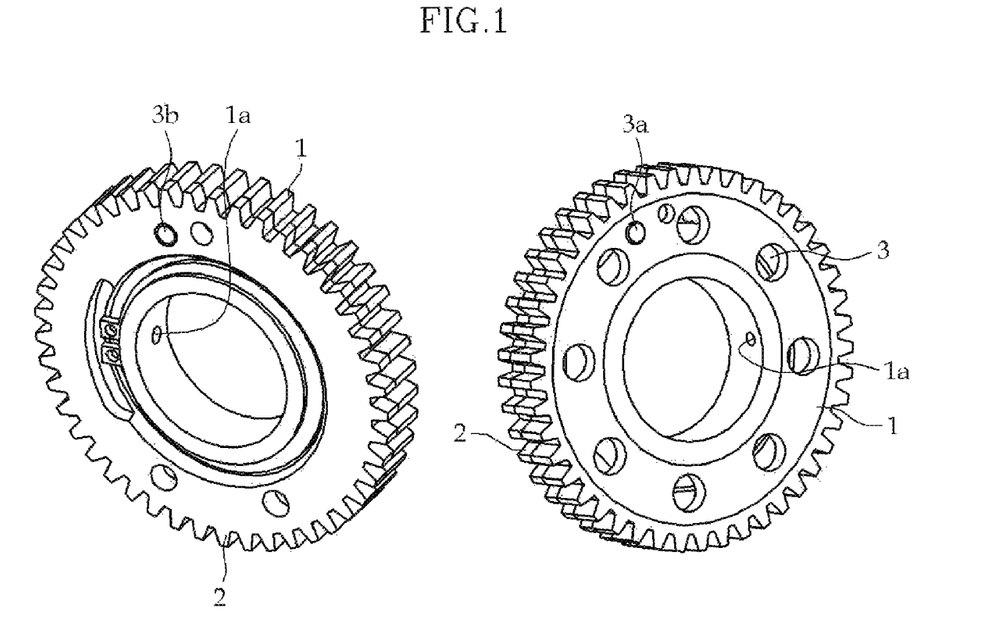
FIG. 1 is a perspective view showing a scissors gear according to an exemplary embodiment of the present invention.

Referring to FIG. 1, a main gear 1 and a sub-gear 2, which are separated into two parts, are combined by an arc-shaped scissor spring 3. Both ends of a cut portion of scissors spring 3 have protrusions 3a, 3b, respectively, in which one protrusion 3a is fitted in an assembly hole of main gear 1 and the other protrusion 3b is fitted in an assembly hole of sub-gear 2, such that main gear 1 and sub-gear 2 are combined by scissors spring 3.

Figure 2:
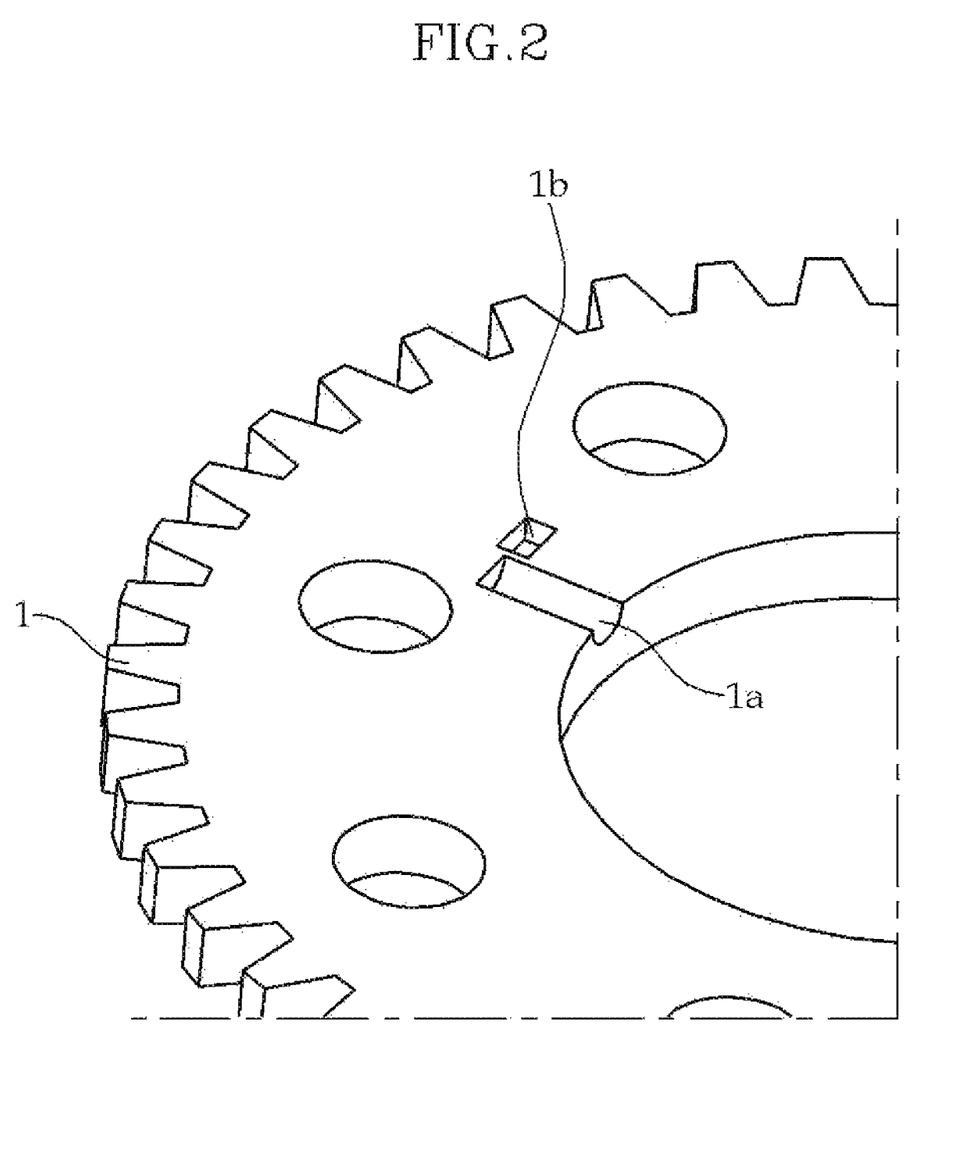
FIG. 2 is a perspective view showing a portion of a main gear according to an exemplary embodiment of the present invention.

As shown in FIG. 2, an oil supply hole 1a is formed in main gear 1 to supply oil from the outside. Oil supply hole 1a is grooved radially outward from the outer end of the inner circumference around which a gear shaft is fitted and a check valve mounting hole 1b is axially grooved adjacent to oil supply hole 1a.

Figure 3:
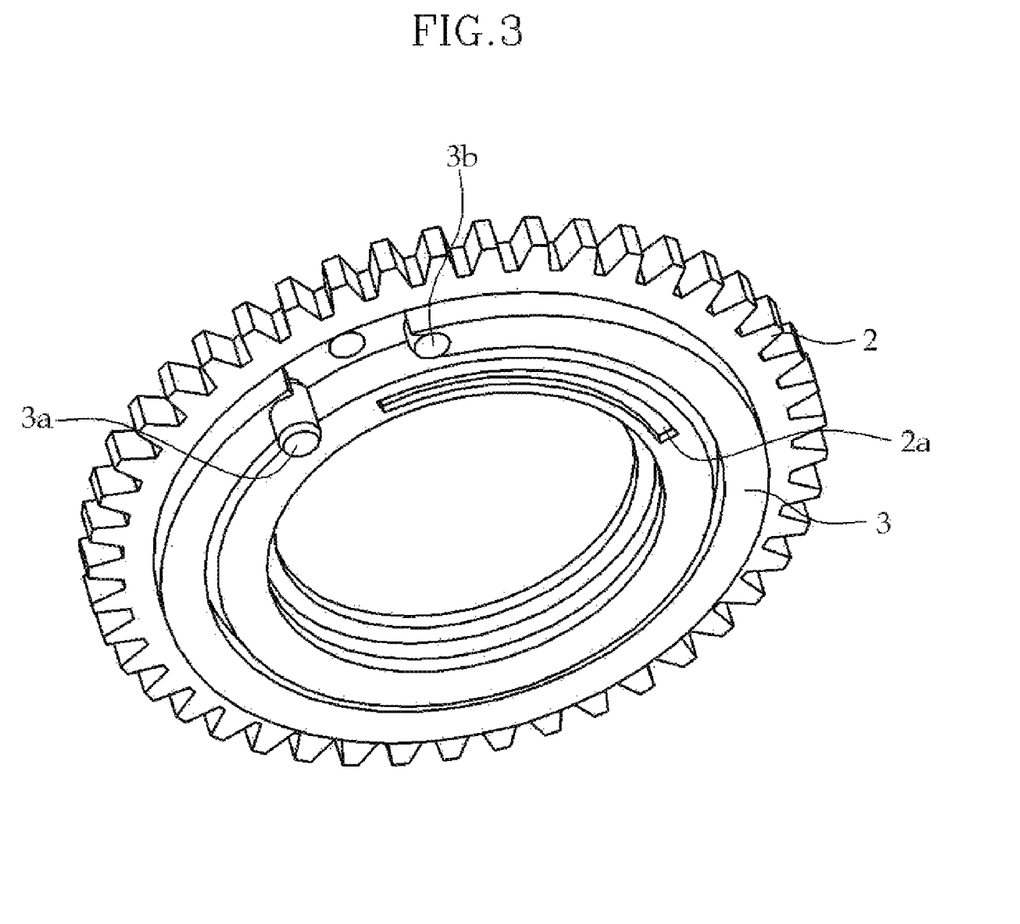
FIG. 3 is a perspective view showing a sub-gear according to an exemplary embodiment of the present invention.

As shown in FIG. 3, an arc-shaped oil groove 2a is formed to be recessed in the axial direction on the boss of sub-gear 2 where the gear shaft is fitted.

Figure 4:
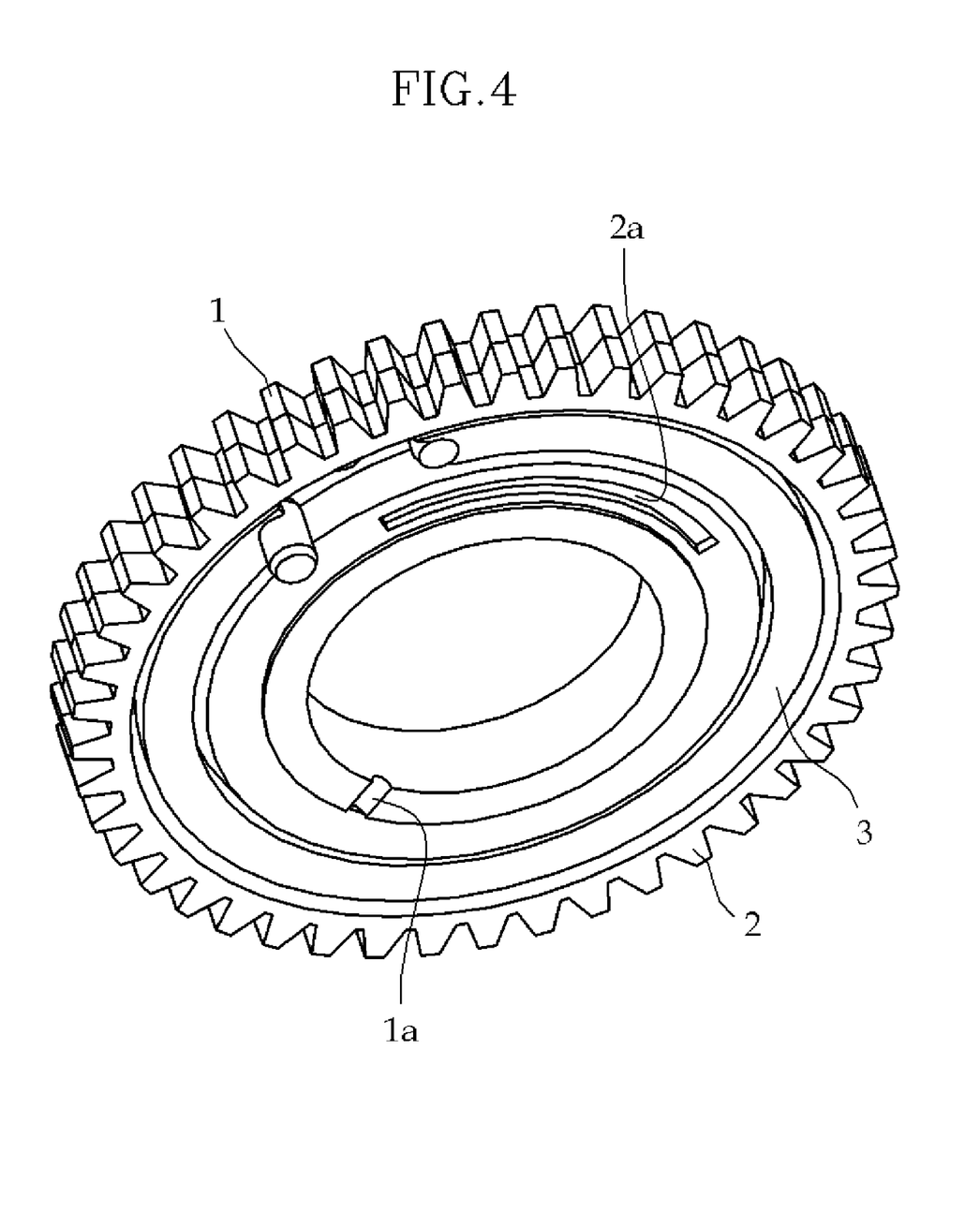
FIG. 4 is a perspective view of the scissors gear assembled, according to an exemplary embodiment of the present invention.

Oil supply hole 1a of main gear 1 is positioned adjacent to a side of oil groove 2a of sub-gear 2 as shown in FIG. 4.

Alternatively, it may be possible to form an oil groove in main gear 1 and an oil supply hole in the sub-gear.

Figure 5:
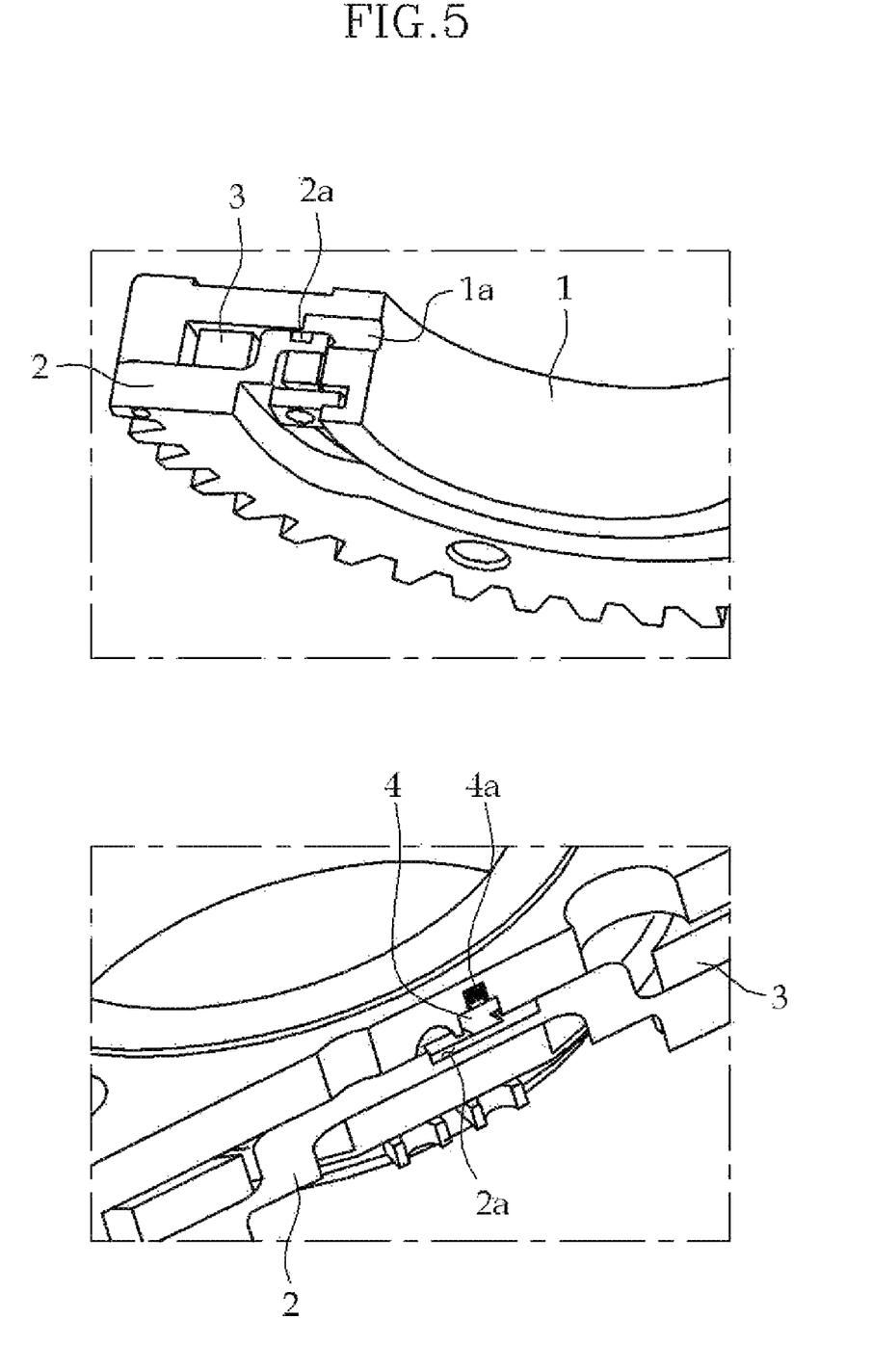
FIG. 5 is a cross-sectional view showing when a check valve according to an exemplary embodiment of the present invention opens an oil groove.

A spring 4a is inserted in check valve mounting hole 1b of main gear 1 and check valve 4 is elastically supported by spring 4a as shown in FIG. 5. Further, check valve 4 is inserted in oil groove 2a of sub-gear 2 to move along oil groove 2a.

In the position shown in FIG. 5, oil supply hole 1a of main gear 1 is positioned to be communicated with oil groove 2a of sub-gear 2 and oil groove 2a is open by check valve 4 to supply oil.

Figure 6:
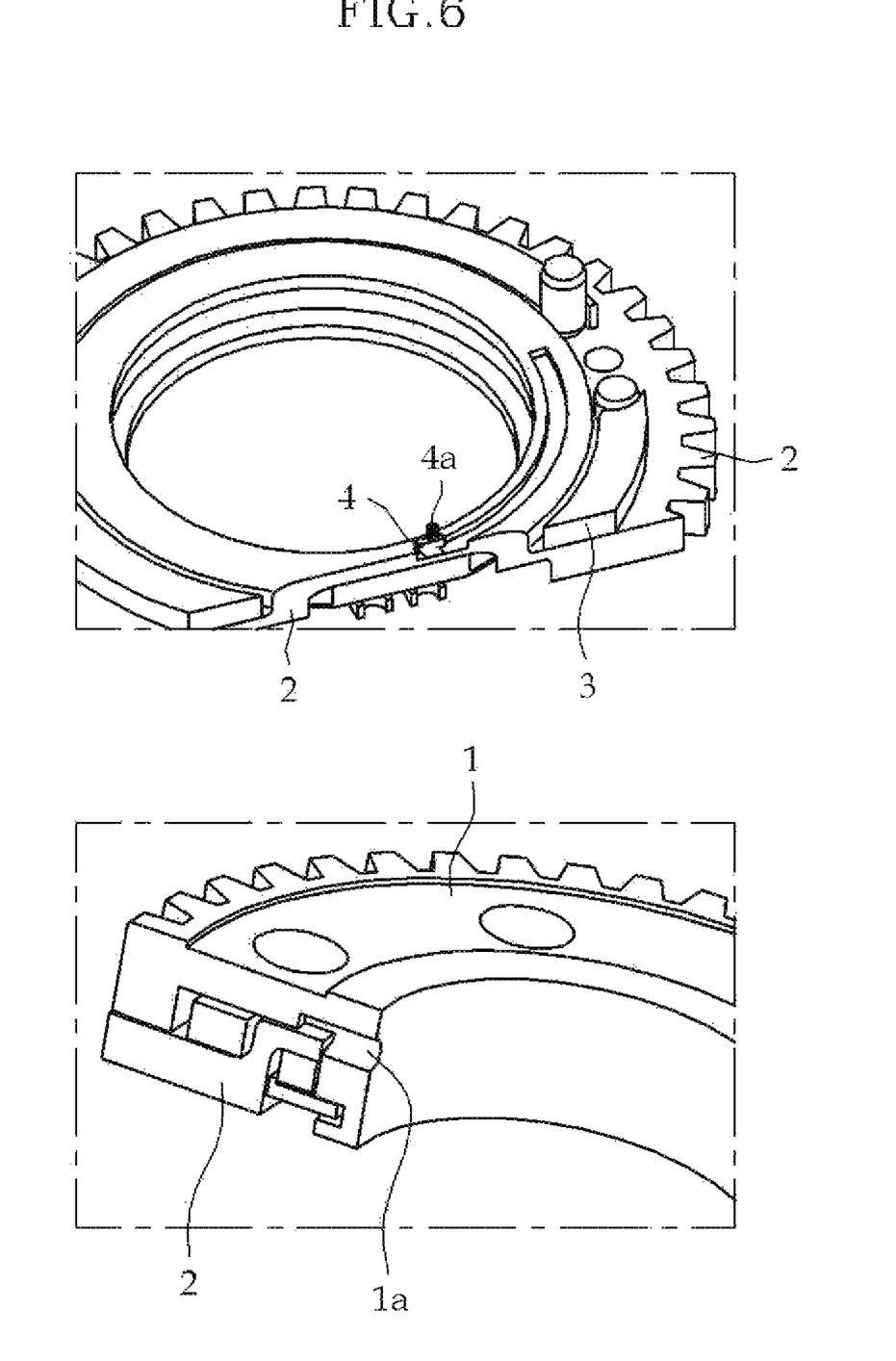
FIG. 6 is a cross-sectional view showing when the check valve according to an exemplary embodiment of the present invention closes the oil groove.

FIG. 6 shows when oil supply hole 1a of main gear 1 is positioned not to be connected with oil groove 2a of sub-gear 2 and oil groove 2a is closed by check valve 4.

Figure 7:
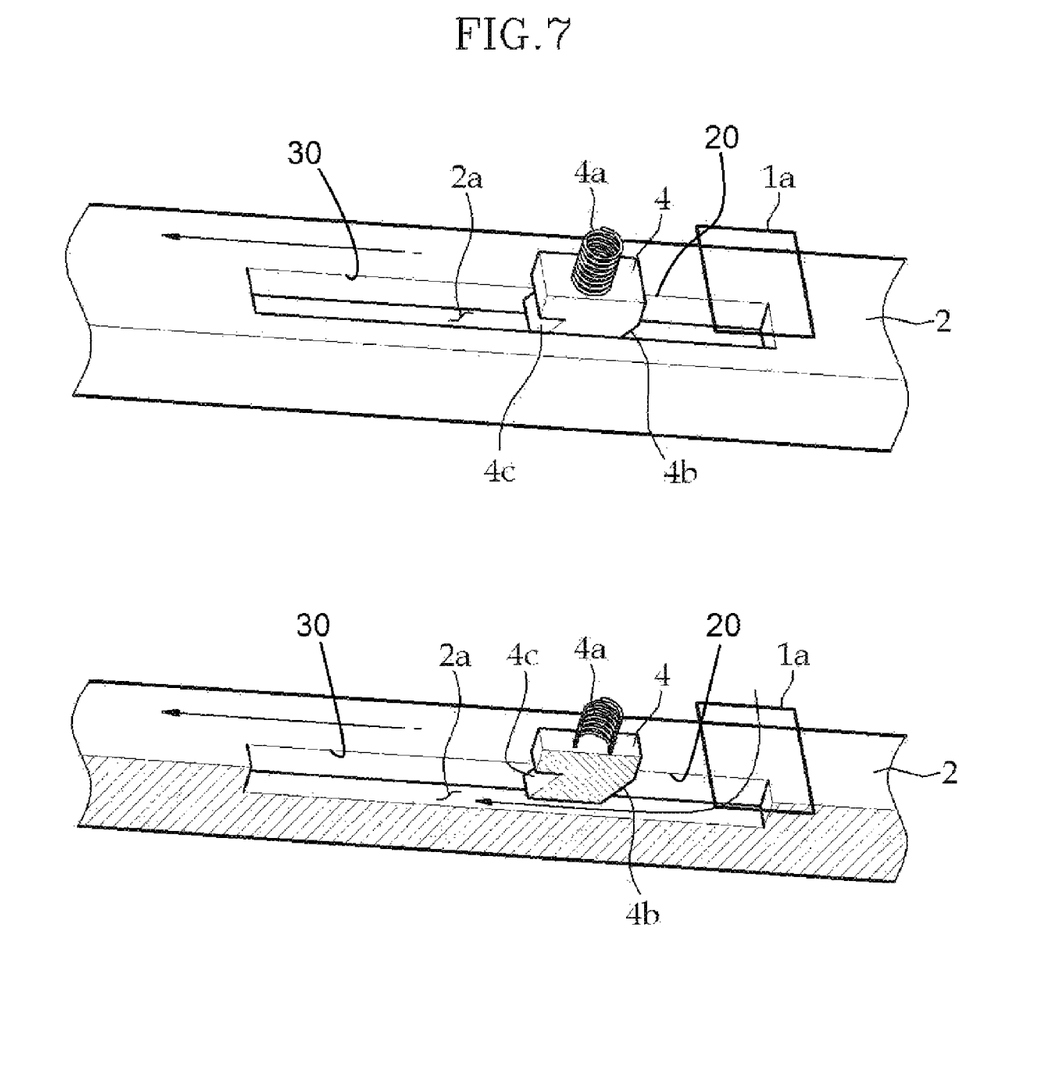
FIGS. 7 and 8 are views illustrating the operation of the check valve according to an exemplary embodiment of the present invention.
Figure 8:
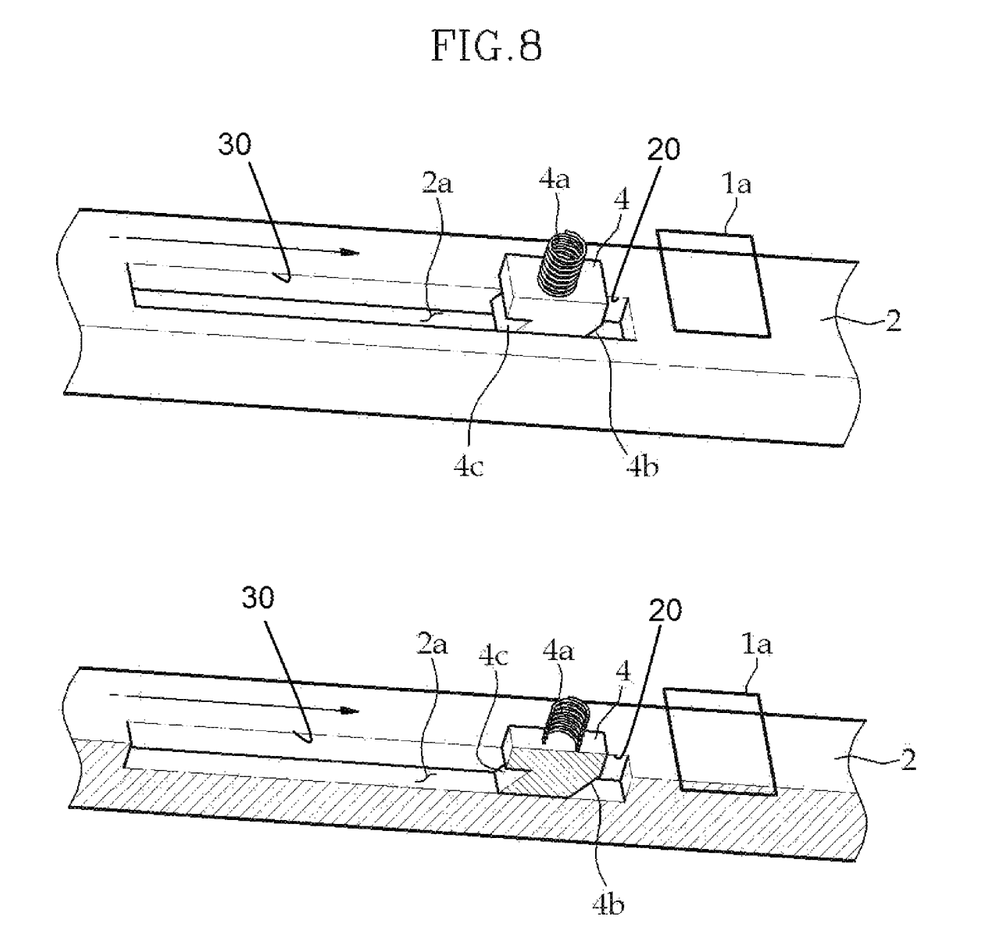

FIGS. 7 and 8 are views showing in detail the operation of the check valve, in which oil supply hole 1a is positioned to be communicated with oil groove 2a to supply oil, and the check valve is pushed upward while compressing spring 4a by pressure of the oil that is applied to an upward slope portion 4b of check valve 4 in a first chamber 20 while the first chamber 20 is compressed when sub-gear 2 moves in the direction of an arrow, such that oil groove 2a is opened and oil is supplied into oil groove 2a.

However, as shown in FIG. 8, when sub-gear 2 rotates in the direction of an arrow while oil is not supplied, with oil supply hole 1a positioned not to be connected with oil groove 2a, the oil at the left of check valve 4 moves toward check valve 4, such that the pressure of the oil is applied to a downward slope portion 4c of check valve 4 to press downward check valve 4 in a second chamber 30 while the second chamber 30 is compressed and oil groove 2a is correspondingly closed by the check valve.

Therefore, the oil at the left from the check valve in oil groove 2a cannot move and is pressurized, and on the contrary, the pressure applied as a damping force to the rotation of the sub-gear, such that it absorbs and attenuates vibration of the sub-gear.

Figure 9:
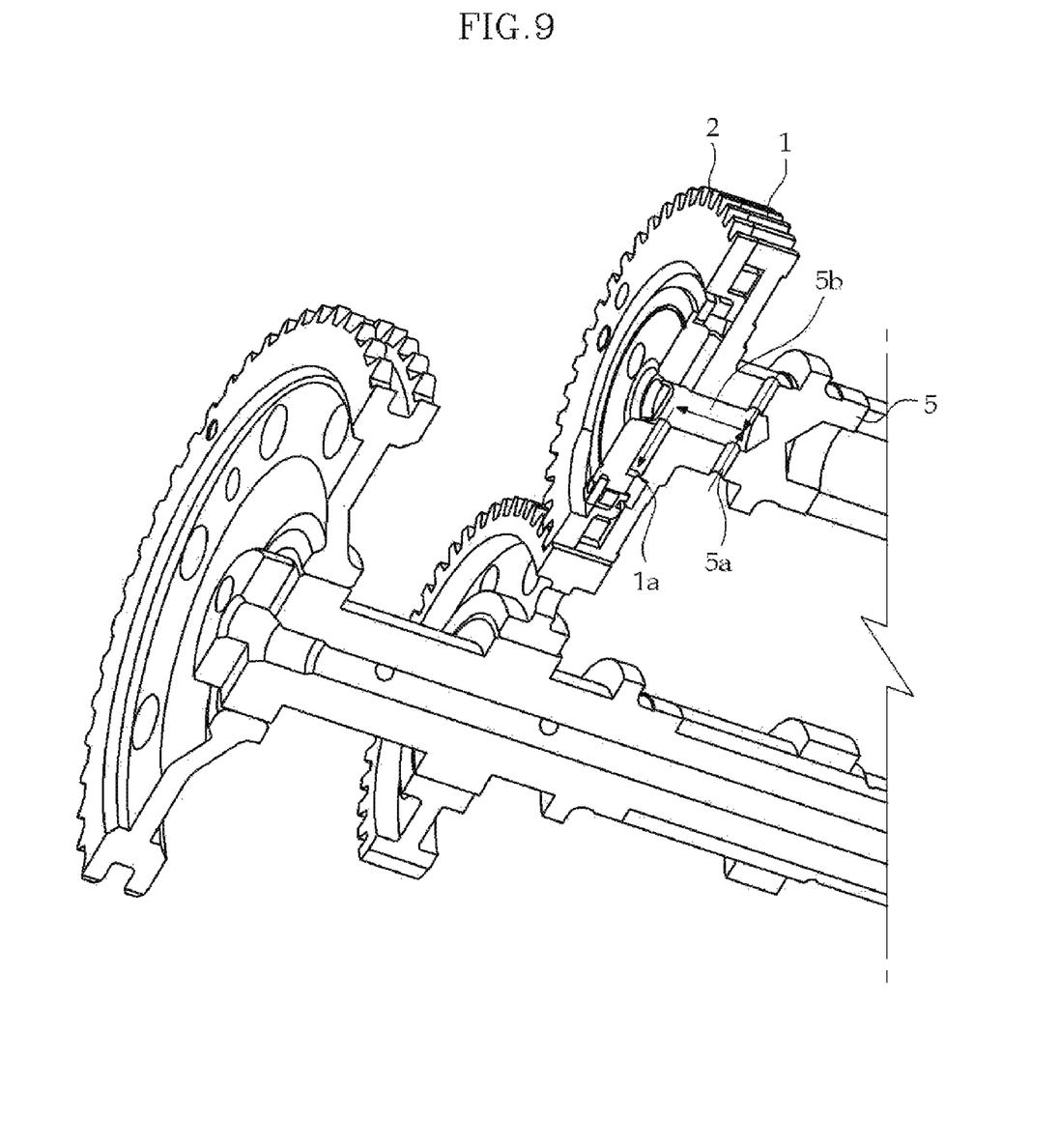
FIG. 9 is a cross-sectional view showing when a gear shaft is fitted in the scissors gear according to an exemplary embodiment of the present invention.

Referring to FIG. 9, an oil supply hole 5a is radially formed through gear shaft 5 that is fitted in the scissors gear, oil supply hole 5a is communicated with an oil channel 5b axially formed in the gear shaft, and oil channel 5b is formed to be communicated with oil supply hole 1a of main gear 1, such that oil can be supplied through an oil main gallery formed at a cylinder head.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A scissors gear comprising:
    a main gear and a sub-gear co-axially combined by a scissors spring therebetween to integrally rotate;
    a first oil supply hole formed in the main gear or the sub-gear to supply oil from the outside;
    an oil groove formed in the sub-gear or the main gear to receive the oil by being selectively communicated with the first oil supply hole; and
    a check valve that is disposed in the main gear or the sub-gear to open/close the oil groove;
    wherein the check valve is disposed to be biased against the oil groove by an elastic member;
    wherein the check valve has an upward slope portion that opens the oil groove while the check valve is pushed upward by a first oil pressure supplied from the first oil supply hole, the first oil pressure occurring by a movement of the sub-gear so as for the first oil supply hole to be communicated with the oil groove; and
    wherein the check valve has a downward slope portion that closes the oil groove while the check valve is pressed downward by a second oil pressure in the oil groove, the second oil pressure occurring by a movement of the sub-gear so as for the first oil supply hole to not be communicated with the oil groove.

2. The scissors gear as defined in claim 1, wherein the upward slope portion is formed to face the first oil supply hole and the downward slope portion is formed at the opposite side of the upward slope portion.

3. The scissors gear as defined in claim 2, wherein the upward slope portion is formed to be slanted with a predetermined acute angle toward the first oil supply hole.

4. The scissors gear as defined in claim 2, wherein the downward slope portion is formed to be slanted with a predetermined obtuse angle toward the first oil supply hole.

5. The scissors gear as as defined in claim 1, wherein a gear shaft is fitted in the main gear and the sub-gear, and a second oil supply hole through which the oil is supplied from the outside and an oil channel for supplying the oil in the second oil supply hole into the first oil supply hole of the main gear are formed in the gear shaft.

6. The scissors gear as defined in claim 5, wherein the gear shaft is supplied with the oil from a main oil gallery of a cylinder head.

7. A scissors gear comprising:
a main gear and a sub-gear that are co-axially combined by a scissors spring to integrally rotate;
a first oil supply hole formed in the main gear or the sub-gear to supply oil from the outside;
an oil groove formed in the sub-gear or the main gear to receive the oil by being selectively communicated with the first oil supply hole; and
a check valve that is disposed in the main gear or the sub-gear to open/close the oil groove and to be biased against the oil groove via an elastic member;
wherein the check valve has an upward slope portion that opens the oil groove while the check valve is pushed upward by a first oil pressure supplied from the first oil supply hole, the first oil pressure occurring by a movement of the sub-gear so as for the first oil supply hole to be communicated with the oil groove; and
wherein the check valve has a downward slope portion that closes the oil groove while the check valve is pressed downward by a second oil pressure in the oil groove, the second oil pressure occurring by a movement of the sub-gear so as for the first oil supply hole to not be communicated with the oil groove.

8. The scissors gear as defined in claim 7, wherein the upward slope portion is formed to face the first oil supply hole, while the downward slope portion is formed at the opposite side of the upward slope portion.

9. The scissors gear as defined in claim 8, wherein the upward slope portion is formed to be slanted with a predetermined acute angle toward the first oil supply hole.

10. The scissors gear as defined in claim 8, wherein the downward slope portion is formed to be slanted with a predetermined obtuse angle toward the first oil supply hole.

11. The scissors gear as as defined in claim 7, wherein a gear shaft is fitted in the main gear and the sub-gear, and a second oil supply hole through which the oil is supplied from the outside and an oil channel for supplying the oil in the second oil supply hole into the first oil supply hole of the main gear are formed in the gear shaft.

12. The scissors gear as defined in claim 11, wherein the gear shaft is supplied with the oil from a main oil gallery of a cylinder head.

13. The scissors gear as defined in claim 1,
wherein the check valve is slidably disposed in the oil groove of the main gear or the sub-gear,
wherein the upward slope portion opens the oil groove while the check valve is pushed upward by the first oil pressure in a first chamber supplied from the first oil supply hole when the sub-gear moves in a first direction to press the first chamber of the oil groove, and
wherein the downward slope portion closes the oil groove while the check valve is pressed downward by the second oil pressure in a second chamber of the oil groove when the sub-gear moves in the second direction to press the second chamber.

14. The scissors gear as defined in claim 7,
wherein the check valve is slidably disposed in the oil groove of the main gear or the sub-gear,
wherein the upward slope portion opens the oil groove while the check valve is pushed upward by the first oil pressure in a first chamber supplied from the first oil supply hole when the sub-gear moves in a first direction to press the first chamber of the oil groove, and
wherein the downward slope portion closes the oil groove while the check valve is pressed downward by the second oil pressure in a second chamber of the oil groove when the sub-gear moves in the second direction to press the second chamber.

* * * * *